United States Patent [19]

Hosomizu et al.

[11] Patent Number: 4,712,902

[45] Date of Patent: Dec. 15, 1987

[54] DEVICE FOR INDICATING AN OBJECT DISTANCE FOR FLASH PHOTOGRAPHY

[75] Inventors: Hiroshi Hosomizu, Nara; Kenji Tsuji, Amagasaki; Makoto Kamiya, Sakai, all of Japan

[73] Assignee: Minolta Camera Kabushiki Kaisha, Osaka, Japan

[21] Appl. No.: 819,695

[22] Filed: Jan. 17, 1986

[30] Foreign Application Priority Data

Jan. 18, 1985 [JP] Japan .................. 60-6016[U]

[51] Int. Cl.$^4$ .......................................... G03B 15/05
[52] U.S. Cl. .............................. 354/416; 354/421; 354/127.13
[58] Field of Search ............. 354/416, 465, 471, 472, 354/474, 475, 421, 127.1, 127.11, 127.13, 129, 145.1

[56] References Cited

U.S. PATENT DOCUMENTS

| | | | |
|---|---|---|---|
| 4,398,127 | 8/1983 | Bahn et al. | 354/416 |
| 4,494,851 | 1/1985 | Maida et al. | 354/421 |
| 4,547,057 | 10/1985 | Kataoka | 354/415 |
| 4,550,996 | 11/1985 | Taniguchi et al. | 354/416 |
| 4,558,939 | 12/1985 | Taniguchi et al. | 354/416 |

*Primary Examiner*—Russell E. Adams
*Attorney, Agent, or Firm*—Burns, Doane, Swecker & Mathis

[57] ABSTRACT

In a device for indicating a camera-to-object distance for flash photography, an electronic flash device receives data from a camera, the data being indicative of a set value of film speed, a set value of exposure to be compensated from a proper exposure and a value of diaphragm aperture to be controlled. The flash device calculates a camera-to-object distance in accordance with the above three data and the limit value of the flash light to be emitted from a light emitter, the camera-to-object distance indicating such an effective object distance that an object at the distance is illuminated with sufficient amount of flash light to effect a desired film exposure corresponding to the exposure compensation value, or an automatic flash available range of the object distance that an object within the range is illuminated by automatically controlled flash light to effect the desired film exposure corresponding to the exposure compensation value.

9 Claims, 8 Drawing Figures

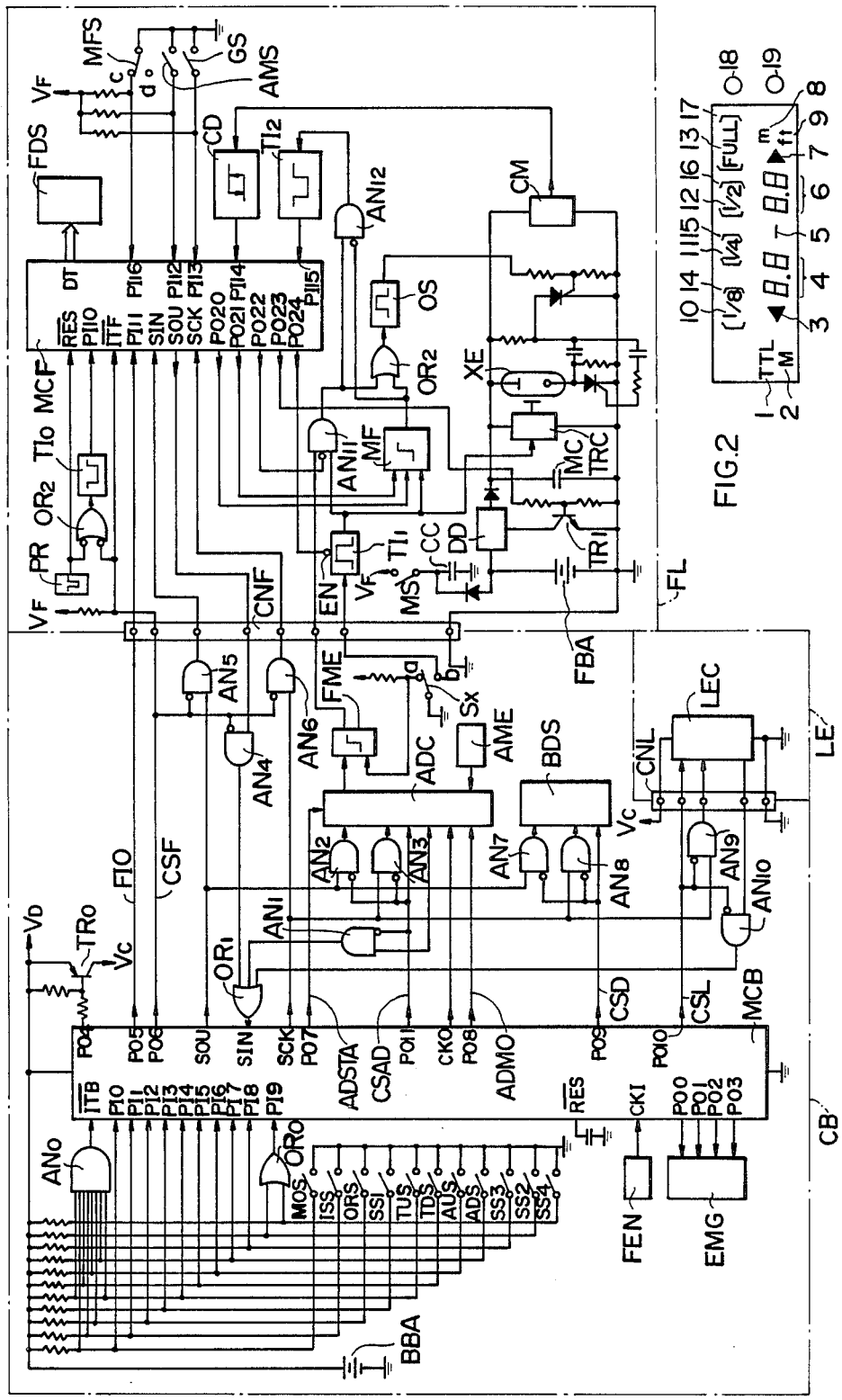

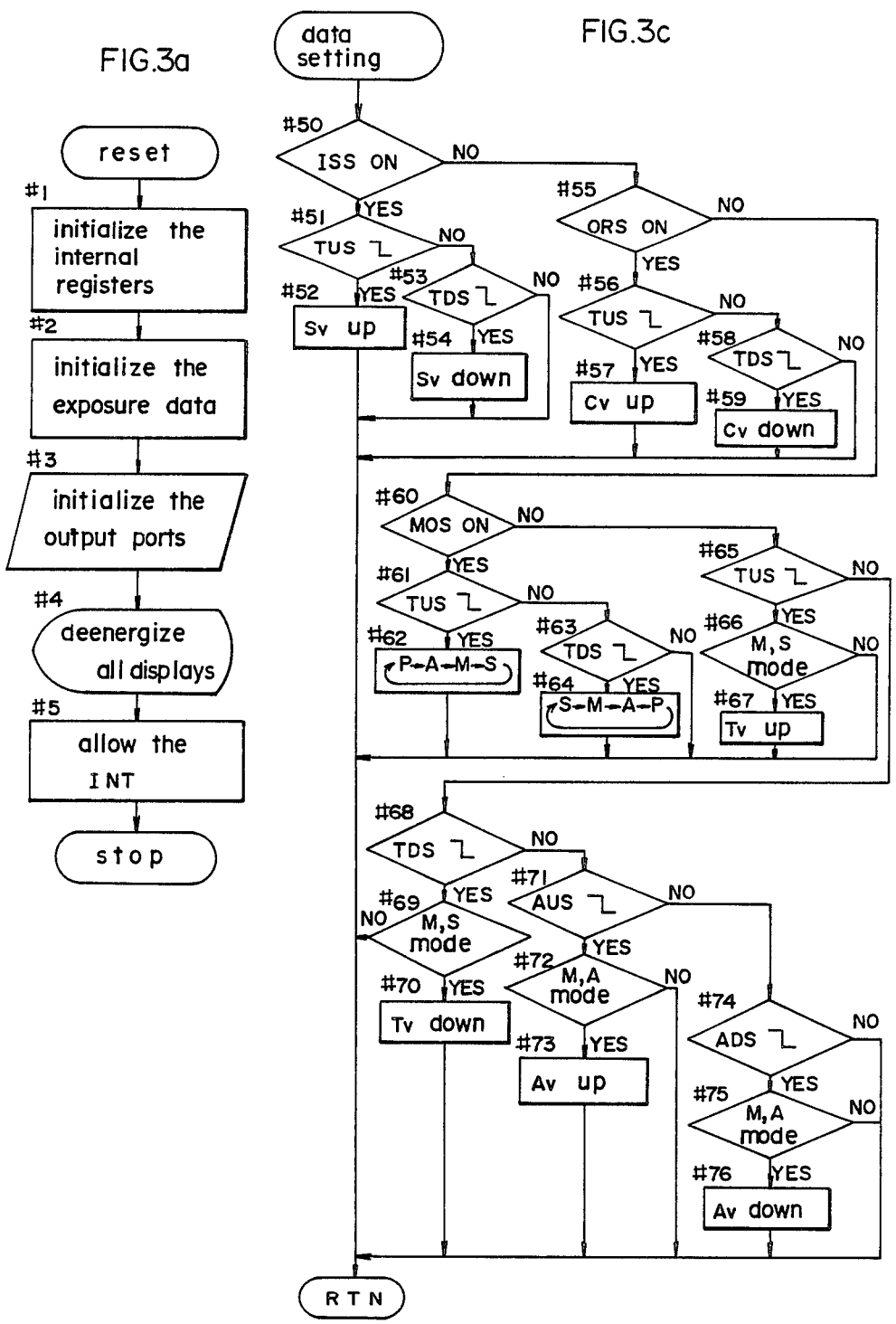

DEVICE FOR INDICATING AN OBJECT DISTANCE FOR FLASH PHOTOGRAPHY

BACKGROUND OF THE INVENTION

1. Field of the Invention

The present invention relates to an indicating device and more particularly to such an indicating device which indicates data of a camera-to-object distance (hereinafter referred to as an object distance) for flash photography determined on the basis of a film speed, a diaphragm aperture value and amount of light to be emitted from the electronic flash device (hereinafter referred to as emitted light amount). One example of the object distance data is a data of an effective object distance that guarantees a proper exposure with a given amount of flash light. In other words, the effective object distance means the distance for which the proper exposure is guaranteed when a picture is taken of an object at that distance, with the object being illuminated by the given amount of flash light. Another example is an automatic flash available object distance range which means such an object distance in which the proper exposure is guaranteed for an object within the range, with the object being illuminated by automatically controlled flash light. The flash light may be controlled in such a way that the light projected from the flash device and reflected by the object is measured and that the flash light emission is interrupted when the amount of reflected light reaches the predetermined level expected to provide a proper exposure.

2. Description of the Prior Arts

Many cameras have been proposed wherein amount of expoure compensation or adjustment from a predetermined amount of exposure is manually set; thus a picture can be taken with a desired exposure to produce a particular photographic effect intended by the user. When the user makes a flash photograph with such compensated exposure, it is necessary to either adjust the emitted flash light or change the object distance by an amount corresponding the desired exposure compensation amount. The present invention relates to an indicating device for indicating the object distance for flash photography with the distance being changed in accordance with the exposure compensation. The invention is contemplated to eliminate the following inconvenience.

In an electronic flash device wherein the effective object distance of flash photography is indicated through a mechanical or electric calculation device in accordance with manually set values such as the film speed, the diaphragm aperture and emitted light amount, a manual adjustment may be performed on the flash device to change the value of the film speed or the diaphragm aperture by an amount comensurate with the amount of the exposure compensation set on the camera. However, such a design requires manual adjustment of the flash device as well as a camera adjustment for the exposure compensation, resulting in an unnecessarily complex operation. If the user fails to make the adjustments, the resultant picture will not have the photographic effect intended by the user. Also, the camera and the flash device must be readjusted when a flash photograph with a proper exposure is desired after a flash photograph with the compensated exposure has been taken. Another flash device has been proposed wherein data of a set film speed and diaphgram aperture are supplied from a camera to a flash device so that the flash device determines the predetermined amount of exposure on the basis of the supplied data and the data of the maximum flash light amount to be emitted by the flash device, with the determined distance being introduced (see a Japanese laid open patent application with a laid-open No. 59-109034). The proper exposure object distance is such a distance that an object at the distance can be illuminated with sufficient amount of light to effect sufficient exposure for the picture to be taken. However, the proposed flash device is not designed so that the object distance data changes in accordance with the amount of exposure compensation set in the camera. Hence, if the compensation function is required, the flash device must be provided additionally with a manual setting means and calculating means for changing the object distance data in accordance with the set exposure compensation amount, resulting in bulkiness of the flash device. Further, the provision of the manual setting means makes the manual setting operation complex and increases the possibility of failure of achieving the desired photographic effect, as noted in the case above.

OBJECTS OF THE INVENTION

An object of the present invention is to provide a device for indicating an object distance for flash photography. The device indicates on a flash device an object distance determined on the basis of a set film speed, a set diaphragm aperture value and an emitted light amount, the device automatically changing the indicated object distance with the change of the exposure compensation amount set on the camera with no manual operation being required on the flash device.

Another object of the present invention is to provide a device for indicating an object distance for flash photography which device prevents the above failure and is simple in operation.

SUMMARY OF THE INVENTION

In the present invention, data of a set film speed, a diaphragm aperture value and a set exposure compensation amount are supplied from a camera to a flash device and the flash device is provided with a calculating means which calculates the object distance on the basis of the supplied data and the data of the emitted light amount of the flash device. Thus the calculated object distance represents such a distance in which the object within the distance is illuminated with light of an amount sufficient for picture-taking with the compensated exposure.

According to the present invention, the data of the object distance calculated by the calculating means automatically changes in response to the change of the exposure compensation amount set on the camera. As a result, no operation is required for changing the object distance data on the flash device to correspond to the exposure compensation amount setting operation on the camera, so that the photography operation is simple. Additionally, the operation for the exposure compensation is required only on the camera, failure of operation either on the camera or flash device that could result in the failure of photography is thus avoided.

Other objects and advantages of the invention will become apparent in the following description of the accompanying drawings.

BRIEF DESCRIPTION OF THE DRAWINGS

FIG. 1 is a block diagram showing a circuit construction of an embodiment of the present invention;

FIG. 2 is an illustration of all the segments to be displayed by indicating means FDS in FIG. 1;

FIGS. 3a, 3b and 3c are flow charts for showing the operation of a microcomputer MCB in the camera in FIG. 1.

DESCRIPTION OF THE PREFERRED EMBODIMENT

Figure 3B:
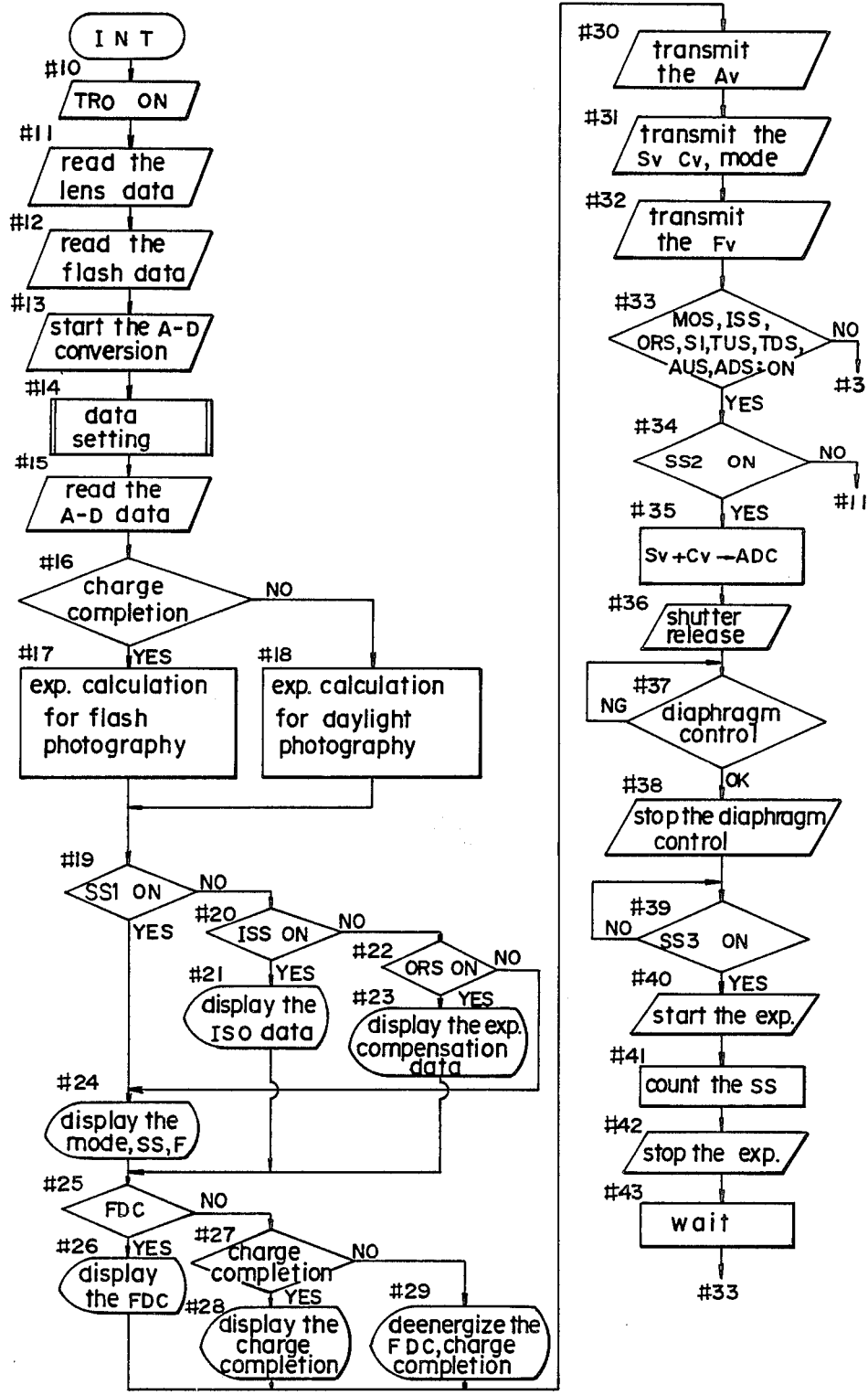

FIG. 1 is a block diagram showing the circuit construction of a camera system composed of a flash device circuit FL, a camera body circuit CB and an exchangeable lens circuit LE. The camera body circuit CB is electrically connected with the flash device circuit FL through a connector CNF while the camera body circuit CB is electrically connected with the exchangeable lens circuit LE through a connector CNL. In the camera body CB, a power source battery BBA supplies power through power supply line VD to the pull-up resistors for the microcomputer MCB, a display section BDS, AND gates AN0 through AN10, OR gates OR0 and OR1 and switches MOS, ISS, ORS, TUS, TDS, AUS, ADS, SS1, SS2, SS3 and SS4. The switch MOS is a mode selection switch which is closed to select one of four exposure control modes, i.e. a programmed automatic exposure control mode (hereinafter referred to as P mode), a diaphragm aperture-priority automatic exposure-time control mode (hereinafter referred to as A mode), and an exposure-time priority automatic diaphragm control mode (hereinafter referred to as S mode) and a manual exposure control mode (hereinafter referred to as M mode). The switch ISS is a film speed switch which is closed for the confirmation and/or adjustment of the film speed. The switch ORS is an override or exposure compensation switch which is closed for the confirmation and/or adjustment of the amount of intentional exposure compensation from a proper exposure. The switch SS1 is a light measuring switch which is closed by depression of a shutter release button (not shown) to the first stage.

The switch TUS is a time-up switch which is closed to increment the set exposure time data by one step, i.e. one EV to a value corresponding to a high shutter speed. When the switch TUS is closed while the mode selection switch MOS is being closed, the exposure control mode is changed by one step for each closure of the switch TUS in the order of P-A→M→S→P→A . . . mode. When the switch TUS is closed while the film speed switch ISS is being closed, the film speed value is incremented by ⅓ Ev step for each closure of the switch TUS. When the switch TUS is closed while the exposure compensation switch ORS is being closed, the amount of exposure compensation is incremented by one step, i.e. one Ev for each closure of the switch TUS. The switch TDS is a time-down switch which is closed to decrement the set exposure time data. When the switch TDS is closed while the mode switch MOS is being closed, the exposure control mode is changed in the order opposite to the case when the time up switch TUS is closed. When the switch TDS is closed while the film speed switch ISS is being closed, the film speed value is decremented by ⅓ Ev step for each closure of the switch TDS. When the switch TDS is closed while the exposure compensation switch ORS is being closed, the amount of exposure compensation is decremented by one EV step for each closure of the switch TDS. The switch AUS is an aperture value up switch for incrementing the diaphragm aperture values by ½ Ev step to a value corresponding to a smaller diaphragm aperture size. The switch ADS is an aperture value down switch for decrementing the diaphragm aperture value by ½ by Ev step to a value corresponding to a larger diaphragm aperture size.

The above mentioned eight switches are connected to AND gate AN0 such that closure of any one of the switches causes the output of the AND gate AN0 to drop to "Low" thereby causing an interruption signal of "Low" to be input to the interruption terminal INTB of the microcomputer MCB. The opening or closure of those eight switches is monitored through input ports PI0 through PI7 of the microcomputer MCB and the microcomputer MCB determines the opening or closure of the switches by the levels at the input ports.

The switch SS2 is a release switch which is closed when the shutter release button is depressed to the second stage. The switch SS4 is a safety switch which is opened upon completion of the exposure control operation e.g. upon completion or termination of the travel of the trailing or rear shutter curtain of the shutter mechanism in the camera. The safety switch SS4 is closed when the shutter mechanism (not shown) is cocked. The switches SS2 and SS4 are connected to OR gate OR0. The microcomputer MCB starts its exposure control operation in response to "Low" output of the OR gate OR0. Thus, when the shutter mechanism has not been cocked with the safety switch SS4 being open, the output of the OR gate OR0 remains at "High" and the exposure control operation in not started even if the release switch SS2 is closed. The switch SS3 is closed when a reflex mirror (not shown) of the camera has been lifted to the picture taking position, and is opened when the reflex mirror begins to lower. Note that the camera of the present invention is a single lens reflex camera with a focal plane shutter mechanism and an exchangeable objective lens.

An encoder FEN generates pulses with the diaphragm stopping down operation with the number of the pulses corresponding to the amount of diaphragm stopping down. The pulse from the encoder FEN is applied to the clock input terminal CKI of the microcomputer MCB. When the desired or predetermined number of pulses corresponding to amount of diaphragm stopping down have been input from the encoder FEN, the microcomputer outputs "Low" pulse from its output port PO1 to actuate a diaphragm control electro-magnet in the electromagnet circuit EMG and interrupt the diaphragm stop-down operation. Besides the diaphragm control electromagnet, the electromagnet block EMG includes a release electromagnet for initiating the diaphragm stopping down operation and the reflex mirror lifting operation in response to "Low" pulse from the output port PO0 of the microcomputer MCB, a preceding shutter curtain electro-magnet for initiating the travel of the preceding or front shutter curtain of the focal plane shutter mechanism in response to "Low" pulse from the output port PO2 of the microcomputer MCB, and a trailing shutter curtain electromagnet for initiating the travel of the trailing shutter curtain in response to "Low" pulse from the output port PO3 of the microcomputer MCB. When a power supply transistor TR0 is made conductive, electric power is supplied through a power line Vc to light measuring circuits FME and AME in the camera body, and A-D/D-A converter circuit ADC, and encoder FEN, and electromagnet circuit EMG, a pull-up resistor for a switch SX and the lens circuit LEC in the exchangeable lens LE.

The potential at the output port PO5 becomes "Low" when data are transmitted from the camera body to the flash device FL and becomes "High" when data are input thereto from the flash device FL. The potential at the output port PO6 becomes "Low" when data are exchanged with the flash device FL. The microcomputer MCB is provided with a serial data output terminal SOU, a serial data input terminal SIN and a synchronous clock pulse output terminal SCK for the serial data exchange. The switch SX is an X contact or flash synchronization switch which is connected to a terminal b from the completion of the travel of the preceding shutter curtain until the completion of the travel of the trailing shutter curtain, and which is connected to a terminal a at all other times. The light-measuring circuit FME includes a light receiving or photoelectric element for flash control which receives the light coming from an object to be photographed. The light passes through the objective lens and its diaphragm aperture and is reflected by the film plane. The light measuring circuit FME receives analog data (Sv+Cv) which is supplied from the A-D/D-A converter circuit ADC and which represents the sum of the film speed value Sv and the exposure compensation value Cv. When the X contact switch SX is switched to terminal b, the light measuring circuit FME begins to integrate the light reflected by the film plane and incident on the photoelectric element. When the amount of the integration reaches a level commensurate with the data Sv+Cv, the light measuring circuit FME produces a signal for interrupting the light emission to the flash device FL. The light measuring circuit AME includes a light receiving or photoelectric element for daylight photography which receives the light reflected from the object to be photographed and passing through the objective lens and produces an analog signal commensurate with the received light.

Serial data transmission is made between the microcomputer MCB and the A-D/D-A converter circuit ADC when the potential at the output port PO11 is "Low". When "Low" pulse is output from the output port PO7 while the potential at the output port PO8 is "High", the A-D/D-A converter circuit ADC converts the analog signal from the light measuring circuit AME into a digital signal on the basis of the clock pulses fed from the clock output terminal CKO of the microcomputer MCB. The A-D/D-A converter circuit ADC sequentially outputs the converted digital signal to the microcomputer MCB. If the potential at the output port PO8 is "Low", the A-D/D-A converter circuit ADC reads data (Sv+Cv) that corresponds to the sum of the film speed value and the exposure compensation value and converts the read data into an analog signal which is output from the converter circuit ADC. When the potential at the output port PO9 is "Low", the display section BDS reads and displays the data fed from the serial data output terminal SOU.

When the potential at the output port PO10 of the microcomputer MCB is "Low", the lens circuit LEC in the exchangeable lens LE serially outputs to the camera body various lens data in response to the clock pulses fed from the terminal SCK. The lens data are necessary for the exposure calculation and/or object distance calculation. The data includes information indicating the attachment of a relevant exchangeable lens, a data of the full aperture value of the lens, a data of the fully stopped-down aperture value, the focal length value and so on.

The following explains flash device FL. The output of a power source battery FBA is directly applied to a voltage booster circuit DD. The circuit DD feeds its output voltage through a diode to a main capacitor MC to charge the latter. A monitor circuit CM generates a voltage depending on the charged voltage of the main capacitor MC. A trigger circuit TRC generates a trigger signal to fire the Xenon tube XE when "High" signal is applied thereto from a timer circuit TI1. The light emission of the Xenon tube XE is interrupted by a conventional flash interruption circuit when a one-shot circuit OS outputs "High" pulse.

The power source battery FBA is also connected to a power supply line Vf through a diode, a capacitor CC for absorbing the fluctuation of the power source voltage, and a main switch MS. Electric power is supplied through the power supply line to all the flash circuit except the circuit connected to the output of the voltage booster circuit DD. A reset signal output circuit PR outputs "Low" pulse upon closure of the main switch MS. The output of the reset signal output circuit PR is also applied to the reset terminal $\overline{RES}$ of the microcomputer MCF. The pulse from the reset signal output circuit PR is applied through an OR gate OR2 to a timer circuit TI0. The timer circuit TI0 starts counting of a given time e.g. 10 minutes at each time when the output of the OR gate OR2 rises to "High", and outputs "Low" signal to the input port PI10 of the microcomputer MCF until the counting is completed. A selection signal is applied to the other input terminal of the OR gate OR2 from the output port PO6 of the microcomputer MCB in the camera body. Accordingly, when the potential on the signal line CSF becomes "Low" for the data exchange, the dropping of the potential resets the timer TI0 which in turn starts the counting of the given time. As the selection signal of "Low" is output at each time when each data is exchanged, the output of the timer TI0 returns to "High", in the case of the data exchange, when the given time has lapsed after the completion of the data exchange of all data.

The selection signal is also applied to the interruption terminal ITF of the microcomputer MCF so that the microcomputer MCF performs an interrupt operation in response to the dropping of the potential at the terminal ITF to "Low". If the potential on the signal line FIO connected to the input port PI11 is "High" with the interrupt operation having been started, the microcomputer MCF sequentially outputs the signal representing the state of the flash device FL from the serial output terminal SOU in synchronization with the clock pulses applied to the clock terminal. When the potential on the signal line FIO connected to the input port PI11 is "Low", the microcomputer MCF reads through the serial input terminal SIN the serial data from the camera body, in synchronization with the clock pulses input to the clock terminal SCK.

The data transmitted from the flash device FL to the camera body CB is a one-byte data. In the one byte, a charge completion signal indicating the charging of the main capacitor MC above a given level as well as an FDC signal indicating the accomplishment of flash light control in response to the flash interruption signal from the camera body, are output respectively in the form of one bit. The remaining six bits are allotted to data showing other states of the flash device FL. The data transmitted from the camera body CB to the flash device FL are three-byte data. The first byte is allotted to the data representing the controlled diaphragm aperture value AV and the second byte is allotted to the data Sv+Cv based on the film speed value and the exposure compensation value and the data representing the exposure control mode. The third byte is allotted to the data Fv of the focal length of the exchangeable lens. The flash device FL is provided with a movable light projection head or panel which is automatically moved relative to the Xenon tube XE to change the cone of the projected light in accordance with the focus length data and changes its displayed data in accordance with the focal length data.

An emitted light amount setting switch GS is manually operated to set the amount of light to be emitted from the flash device FL. At each time when the switch GS is turned on, the emitted light amount data is changed in the order of Full light emission (FULL)—half light emission (½)—quarter light emission (¼)—and eighth light emission—(⅛). In a manual light control mode, the light to be emitted from the Xenon tube XE is controlled in accordance with the emitted light amount data manually set by the operation of the switch GS. In a TTL mode wherein the flash light emission is interrupted by a flash light interruption signal from the flash photography light measuring circuit FME in the camera, the manually set emitted light amount data serves as an emitted light limitter which limits the maximum amount of light to be emitted in the TTL mode. In this case, the flash light emission is stopped at the manually set amount if the camera does not produce the light interruption signal by the time the flash device has emitted the manually set amount of light. The manually set emitted light amount data are represented by the combination of the potentials at the output ports PO20 and PO21 of the microcomputer MCF (as shown in the following table 1). The potentials are applied to an emitted light limiting circuit MF.

TABLE 1

| Emitted Light Amount | PO20 | PO21 |
| --- | --- | --- |
| Full | H | H |
| ½ | L | H |
| ¼ | H | L |
| ⅛ | L | L |

The emitted light limiting circuit MF starts to directly monitor the light emitted from the Xenon tube XE when the output of a timer circuit TI1 turns to "High". When the monitored light amount reaches a value determined by the data from the output ports PO20 and PO21, the emitted light limiting circuit MF produces "High" output which makes the output of an OR gate OR3 "High", causing the one-shot circuit OS to output a pulse for interrupting the light emission. Note that the emitted light limiting circuit MF may have another form or construction, e.g. wherein the circuit interrupts the light emission when a time corresponding to the emitted light amount data has lapsed after the output of the timer circuit TI1 turns to "High".

A detecting circuit CD detects the level of the output voltage of the monitor circuit CM and has hysteresis characteristic with respect to the detection level. The detection circuit CD produces "High" signal when the output of the monitor circuit CM exceeds a first given level, and continues the production of the "High" level signal until the output of the monitor circuit drops to the second given level (lower than the first level). The output of the detection circuit CD is applied to an input port PI14 of the microcomputer MCF. Receiving the "High" level signal at the input port PI14, the microcomputer MCF makes an indication of charge completion in the display section FDS and transmits a charge completion signal through a serial output terminal SOU to the camera body CB. At the same time, the microcomputer make the potential at the output port PO24 "Low" to provide power to the timer circuit TI1. When the X contact SX is connected to the terminal b, the timer circuit TI1 outputs "High" signal for a period longer than the period required for the full light emission of the Xenon tube XE. The "High" level signal from the timer circuit TI1 actuates the trigger circuit TRC to fire the Xenon tube XE, and initiates the operation of the emitted light limiting circuit MF. At this time, if the potential at the output port PO22 is "Low", AND gate AN11 is unblocked and able to generate a light emission interrupting signal when the AND gate AN11 receives a light interruption signal from the camera CB while the output of the timer circuit TI1 is "High".

An output port PO23 serves as a control terminal for a transistor TR1 which controls the voltage booster circuit DD. When the timer TI0 is in operation, with the detecting circuit CD outputting "Low" signal showing that the main capacitor has not been charged to the given level, the microcomputer MCF outputs "High" signal from the output port PO23 through the transistor TR1 and actuate the voltage booster circuit DD. When the detecting circuit CD outputs "High" signal representing the charge completion of the main capacitor, and/or when the timer TI0 has completed the time counting operation, the potential at the output port PO23 is "Low", which makes the transistor TR1 non-conductive and the voltage booster circuit DD inoperable.

A mode selection switch AMS is manually operated by a key to switch the emitted light control mode of the flash device FL between the TTL mode and the manual mode. When data are input to the serial input terminal SIN from the camera CB with the exposure control mode M in the M mode, the light control mode is switched between the TTL and manual modes each time the switch is turned ON, and the display section FDS indicates the selected mode. At this time, the potential at the output port PO22 is "Low" in the case of the TTL mode, and "High" in the case of the manual mode. When no data is input to the terminal SIN, the potential at the output terminal PO22 remains at "Low" and the display section FDS cannot provide the indication of the emitted light control mode regardless of the position of switch AMS. If the exposure control mode is in the P, A or S mode even though data are input to the terminal SIN, the potential at the output port PO22 remains at "Low" with the display section FDS indicating the TTL mode regardless of the position of the AMS switch.

A timer circuit TI2 outputs "Low" signal of a given time (e.g. 5 sec.) when the AND gate AN11 outputs "High" light interruption signal that has been fed from the light measuring circuit FME. The output of the emitted light control circuit FME is "Low" with the amount of the emitted light having not reached a set value. The "Low" level signal from the timer TI2 is applied to the input port PI15 so that the microcomputer MCF supplies a FDC signal through the serial data output terminal SOU to the camera. The display section FDS thus indicates the FDC, i.e. the completion of a proper flash light control. The FDC signal represents that the flash light has been controlled to provide a proper exposure.

A switch MFS is provided for selecting the units of the flash photography available distance range and the effective object distance in the display section. When the switch MFS is connected to the terminal c, the distance range and the effective distance are indicated in metric units. When the switch MFS is connected to the terminal d, those distance are indicated in feet. The flash photography available range means the range of object distance so that proper exposure can be given in the TTL mode for an object within the range in accordance with a film speed value and an exposure compensation value set in the camera. The effective object distance is always determined in accordance with the manually set emitted light amount, the controlled or anticipated diaphragm aperture, the set film speed and the exposure compensation amount.

FIG. 2 shows all the segments to be displayed in the display section FDS of the flash device FL. A mark 1 represents that the flash light is controlled in the TTL mode, while the mark 2 represents that the flash light is controlled in the manual mode and two-figure numerical segments 4 indicate the lower limit of the flash photography available distance range. A two-figure numerical segments 6 indicate the upper limit of the distance range as well as the effective object distance. A mark 5 is displayed when the distance range is displayed. A mark 3 is displayed when the calculated lower limit of the distance range of the effective object distance is smaller than the smallest lower limit value (e.g. 0.7 meter, which is a distance such that partial shading due to the parallax between the optical axis of the exchangeable lens LE and the light emitted from the flash device FL will not occur.

A mark 7 is displayed when the calculated upper limit of the available distance range and effective distance is greater than a given value, e.g. 28 meters. The mark 8 shows that the value shown by the segments 4 or 6 is a metric value, while the mark 9 shows the the value shown by the segments 4 or 6 is a value expressed in feet. Those segments 1 through 9 are in non-displayed or deenergized state when no data is supplied from the camera, when a period determined by the timer TI0 has lapsed even if the data is supplied or when the main switch MS is open.

The segments 10 through 13 indicate, in simplified forms such as FULL, ½, 174 and ⅛, the limit of the flash light to be emitted in the TTL mode and the manually set emitted light amount in the manual mode. The bracket marks 14 through 17 are arranged to surround the English characters and numerals indicated by the segments 10 through 13. In response to the operation of switch GS, one of the bracket marks 14 through 17 is displayed to indicate the set emitted light data. Those segments 10 through 17 are selectively energized while the main switch MS is closed. The segments 1 through 17 are provided on an LCD (liquid crystal display) panel. An indicator element 18 is energized while the charge completion signal is being generated. Another indicator element 19 is energized while the output of the timer TI2 is at "Low", to make the indication of FDC. Those indicator elements 18 and 19 are composed, for example, of LEDs.

The operation of the camera body with reference to FIG. 3 which is a flow chart showing the operation of the microcomputer MCB in the camera body CB will be described below. When the power source battery BBA is loaded in the camera body CB, the microcomputer MCB starts the reset operation, which begins at step #1. First, the internal registers are initialized at step #1 and the data for the exposure calculation and exposure control are initialized at step #2. For example, the film speed value is set to ISO100, the exposure compensation value to zero, the exposure time to 1/125 sec, the diaphragm aperture value to F5.6 and the exposure control mode to P mode. The potentials at all the output ports are initialized to "High" levels at step #3, and data for denergizing all the displays are transmitted to the display section at step #4. After being set at step #5 to an actuating state in response to an interruption signal to the interruption terminal INTB, the microcomputer MCB assumes an operation-suspending condition with low energy consumption.

When any one of the switches MOS, ISS, ORS, SS1, TUS, TDS, AUS and ADS is closed, the output of the AND gate AN0 drops to "Low" and an interruption signal is input to the interruption terminal INTB so that the microcomputer MCB is actuated and starts the interruption operation beginning at step #10 in the flow-chart of FIG. 3b. In the interruption operation, the potential at the output port PO4 is made "Low" at step #10 to make the transistor TR0 conductive and commence the power supply through the power supply line Vc. Then the microcomputer MCB reads at step #11 various data that are necessary to the exchangeable lens and which are fixedly stored in the lens circuit LEC. The microcomputer MCB also reads at step #12 from the flash device FL the one byte data, including the charge completion signal and the FDC signal. A "Low" level pulse is supplied at step #13 from the output port PO7 to the A-D/D-A converter circuit ADC which starts the A-D conversion of the output of the light measuring circuit AME. Next, a subroutine for setting the data corresponding to the switch that was closed is executed at step #14. The detail of the operation of the data setting subroutine is shown in the flow chart of FIG. 3c, beginning at step #50.

At step #50, it is determined whether or not the film speed setting switch ISS is closed. If the switch ISS is closed, it is determined at step #51 whether the time up switch TUS has been turned on. When the ON state of the switch TUS is detected, the film speed value is incremented by ⅓ Ev step at step #52 and program operation returns to the main routine. When the time-up switch TUS remains steadily in the OFF or ON state, it is then determined at step #53 whether the time-down switch TDS has been turned on. When the ON state of the time-down switch RDS is detected, the film speed value is decremented by ⅓ Ev at step #54 and the program returns. If the switch TDS remains steadily in the OFF or ON state, the program returns without changing the film speed value.

When the film speed switch ISS is not closed at step #50, the program jumps to step #55 wherein it is determined whether or not the exposure compensation switch ORS is closed. If the exposure compensation switch ORS is closed, it is then determined at step #56 whether the time up switch TUS has been turned on. If the ON state of the switch TUS is detected, the exposure compensation value is incremented by one Ev step at step #57 and program operation returns to the main routine. If the time up switch remains in the OF or ON state, it is then determined at step #58 whether the time-down switch TDS has been turned on. If the ON state of the time-down switch TDS is detected, the exposure compensation value is decremented by one Ev step at step #59 and the program returns. If the switch TDS remains in the OFF or ON state, the program returns with the exposure compensation value left unchanged.

Note that when the data changed at step #52, #54, #57 or #59 reach their respective limit values, the data will remain unchanged thereafter from the limit value even if the same switch is closed again and again. When a data reaches its limit value by the operation of one of the switches TUS and TDS, the data will change when the other switch is closed.

If it is determined at step #55 that the exposure compensation switch ORS is not closed, the program jumps to step #60, wherein it is determined whether or not the mode selection switch MOS is closed. If the mode selection switch MOS is closed, it is then determined at step #61 whether the time-up switch TUS has been turned on. If the ON state of the switch TUS is detected, the exposure control mode is changed at step #62 from P to A, A to M, M to S or S to P mode and the program returns. If the switch TUS remains steadily in the OFF or ON state, it is then determined at step #63 whether or not the time-down switch TDS has been turned on. When the ON state of the switch TDS is detected, the exposure control mode is changed by one step for each closure of the switch TDS in the opposite direction from that in step #62 and the program returns. If the switch TDS remains steadily in the OFF or ON state, the program returns with the exposure control mode left unchanged.

When it is detected at step #60 that the mode selection switch MOS is not closed, the program jumps to step #65 wherein it is determined whether the time-up switch TUS has been turned on. If the ON state of the switch TUS is detected, it is then determined at step #66 whether the exposure control mode is set to M or S mode. If the selected exposure control mode is M or S mode, the exposure time value is incremented by one Ev step at step #67 and the operation returns. If the exposure control mode is P or A mode, the program returns with the exposure time value left unchanged. When the ON state of the time-up switch TUS is not detected at step #65, the program jumps to step #68 wherein it is determined whether the time-down switch TDS has been turned on. If the ON state of the switch TDS is detected, it is then determined at step #69 whether the exposure control mode is set to M or S mode. When M or S mode has been set, the exposure time value is decremented by one Ev step at step #70 and the program returns. When P or A mode has been set, the program returns with the exposure time data left unchanged.

When the ON state of the time-down switch TDS is not detected at step #68, the program jumps to step #71 wherein it is determined whether or not the diaphragm aperture value up switch AUS has been turned on. When the ON state of the switch AUS is detected, it is then determined at step #72 whether the exposure control mode has been set to M or A mode. If M or A mode has been selected, the diaphragm aperture value is incremented by $\frac{1}{2}$ Ev step at step #73 and the program returns. If P or S mode has been selected, the program returns with the diaphragm aperture value left unchanged. When the ON state of the diaphragm aperture value of switch AUS is not detected at step #71, the program jumps to step #74 wherein it is determined whether the diaphragm aperture value down switch ADS has been turned on or not. If the ON state of the switch ADS is detected it is then determined at step #75 whether the exposure control mode has been set to M or A mode. If M or A mode has been selected, the diaphragm aperture value is decremented by $\frac{1}{2}$ Ev step at step #76 and the program returns. If P or S mode has been selected, the program returns with the diaphragm aperture value left unchanged. If it is detected at step #74 that the diaphragm aperture value down switch ADS remains unchanged, this means that the light measuring switch SS1 has been closed and program operation returns to step #15 in FIG. 3b.

At step #15, the data of the daylight measurement that has been converted into a digital data is utilized. Next, at step #16, it is determined on the basis of the data read at step #12 whether or not the flash device FL has become completely charged. If the charging has been completed, exposure control data for flash photography are calculated at step #17 and the operation proceeds to step #19. If the charging has not been completed exposure control data for daylight photography is calculated at step #18 and the operation proceeds to step #19. It is determined at step #19 whether the light measuring switch SS1 has been closed. If the light measuring switch SS1 is closed, the display section BDS displays at step #24 the selected exposure control mode and the controlled exposure time and diaphragm aperture value and the operation proceeds to step #25. If the light measuring switch SS1 is open, the operation proceeds to step #20 wherein it is determined whether or not the film speed switch ISS has been closed. When the film speed switch ISS has been closed, the film speed value is displayed at step #21 and the operation jumps to step #25. If the film speed switch ISS is open, it is determined at step #22 whether the exposure compensation switch ORS has been closed. If the exposure compensation switch ORS has been closed, the exposure compensation amount is displayed at step #23 and the operation proceeds to step #25. In the case when the exposure compensation switch ORS is also open, this means that some switch other than the switches SS1, ISS and ORS has been closed. In this case, the operation proceeds to step #24 wherein the same indication that occurs when the light measuring switch SS1 is closed is displayed and the operation proceeds to step #25.

At step #25, it is determined on the basis of the data read at step #12 whether or not the flash light has been controlled. If the FDC signal representing the attainment of the flash light control has been supplied to the microcomputer MCB, the indication of FDC is displayed at step #26 and the operation jumps to step #30. If the FDC signal has not been received, the operation proceeds to step #27 wherein it is determined whether or not the charging of the flash main capacitor MC has been completed. If the charging has been completed, the charge completion is indicated at step #28 and the operation proceeds to step #30. If the charging has not been completed, the indication of the FDC and charge completion is deenergized at step #29 and the operation proceeds to step #30. At step #30, the diaphragm aperture data Av calculated or set at step #14, #17 or #18 is transmitted to the flash device FL. Then the data of Sv+CV and exposure control mode are transmitted to the flash device FL at step #31, and the focal length data Fv of the exchageable lens LE is transmitted to the flash device FL at step #32. After that the operation proceeds to step #33.

At step #33, it is determined whether any one of the switches MOS, ISS, ORS, SS1, TUS, TDS, AUS and ADS is on, and therefore if the potential at any one of the input ports PI0 through PI7 is "Low". If at least one of program switches has not been closed, the operation goes back to step #3 in FIG. 3a to initialize the output port, deenergize the display and suspend program operation with the microcomputer MCB being restarted by an interruption signal fed to the terminal INTB. If any one of the switches has been closed, it is then determined at step #43 whether or not the release switch SS2 has been closed with the output of the OR gate OR0 at "Low". If the output of the OR gate OR0 is "Low", the operation proceeds to step #35. If the output of program OR gate OR0 is "High", the operation goes back to step #11 where the operations described above are repeated.

At step #35, the data of Sv+Cv is supplied to A-D/D-A converter circuit ADC to convert the data into an analog signal which in turn is supplied to light-measuring circuit FME for the flash photography. Then, the release electromagnet is actuated to raise the reflex mirror, which thus stops down the diaphragm aperture at step #36. When the diaphragm is stopped down by the steps of the number commensurate with the diaphragm aperture value calculated or manually set as described above, the diaphragm control magnet is actuated to interrupt the stopping down of the diaphragm at steps #37 and #38. When the switch SS3 is closed at step #39 with the reflex mirror having reached its picture-taking position, the preceding shutter curtain electromagnet is actuated at step #40 to initiate the travel of the preceding shutter curtain. The calculated or set exposure time is counted or measured at step #41 and when the counting has been completed, the trailing shutter curtain electromagnet is actuated to initiate the travel of the trailing shutter curtain and lower the reflex mirror at step #42. After waiting at step #43 for a period during which the lowering of the reflex mirror is completed and the reflex mirror becomes steady at program viewing position, the operation returns to step #33.

In flash photography, the X contact SX is switched from terminal a to terminal b upon completion of the movement of the preceding shutter curtain and the flash device FL begins light emission to illuminate the object to be photographed. The flash photography light measuring circuit FME integrates the light reflected from the object, passing through the exchangeable lens LE and its diaphragm aperture and reflected by the film plane. When the amount of the integration reaches a value corresponding to the data Sv+Cv determined by the film speed value Sv and the exposure compensation value Cv, the camera outputs a flash light interruption signal which turns from "Low" and "High".

The above is the operation of the camera body CB. Next, explanation will be made of the operation of the flash device FL with reference to the flow charts shown in FIG. 4 and 5.

Figure 4A:
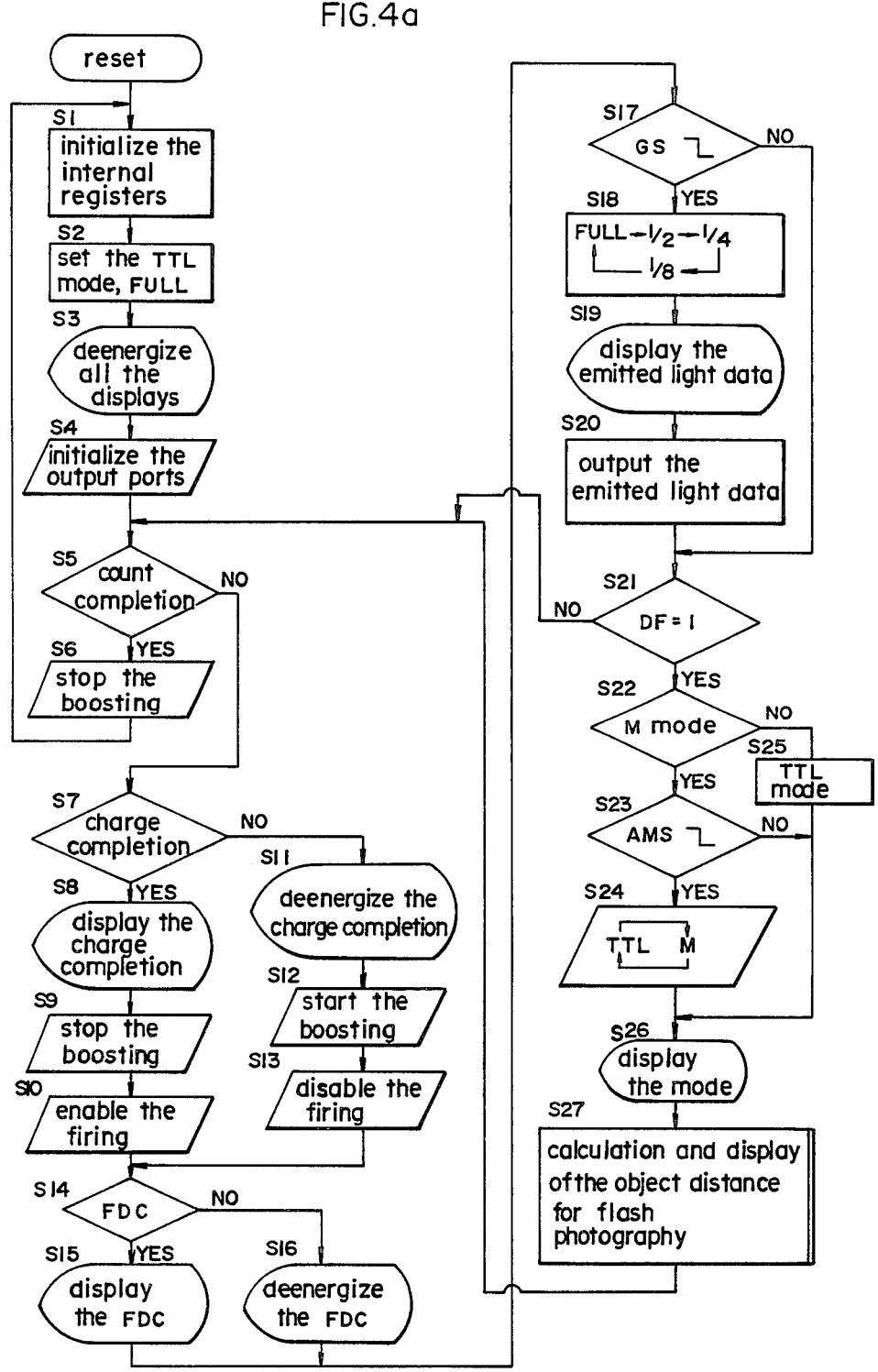
FIGS. 4a, 4b and 5 are flow charts for showing the operation of the microcomputer MCF in the flash device in FIG. 1.

When the power switch MS is closed, the reset signal generating circuit PR outputs "Low" pulse which causes the microcomputer MCF start the reset operation beginning at step s1 in FIG. 4a. The timer TI0 starts measurement or counting of ten minutes. First, the microcomputer MCF initializes its internal registers and resets a flag DF which will be described later (step s1). Then, the light control mode is set to TTL mode and the data of the emitted light is initialized to full light emission (step s2). Next, the display section FDS is deenergized at step s3 and the potentials at all the output ports are initialized to "High" levels at step s4. It is then determined at step s5 whether the timer TI0 has completed the counting. If it has, a "High" signal is input to the input port PI10, the potential at the output port PO23 is made "Low" to block the transistor TR1 and stop the operation of the voltage booster circuit DD at step s6. After that, program operation goes back to step s1 and the above operation is repeated.

If the timer TI0 is still counting with "Low" signal being input to the input port PI10, the operation jumps to step s7 wherein it is determined whether or not the main capacitor has been charged. If the potential at the input port PI14 is "High", indicating the charge completion, the charge completion is displayed at step s8 and the potential at the output port PO23 is made "Low" to stop the voltage boosting operation at step s9. The potential at the output port PO24 is made "Low" to make the timer TI1 operable and enable light emission at step s10. After that the program moves to step s14. When the potential at the input port PI14 is "Low" indicating that the main capacitor has not been charged to the given level, the display of the charge completion is deenergized at step s11 and the potential at the output port PO23 is made "High" to start the voltage boosting operation at step s12. The potential at the output port PO24 is made "High" to stop the operation of the timer TI1 and disable the flash firing at step s13. After that, program operation proceeds to step s14.

At step s14, it is determined whether "Low" signal is being input from the timer TI2 to the input port PI15. If it is within a given time from the interruption of the flash firing by the flash light interruption signal from the flash photography light measuring circuit FME in the camera body, the potential at the input port PI15 is "Low" and the operation proceeds to step s17 after the FDC indication is made at step s15. If the potential at the input port PI15 is "High", the FDC indication is not made at step s16 and the operation proceeds to step s17. At step s17, it is determined whether the emitted light amount setting switch GS has been turned on. If the switch GS remains steadily in the OFF or ON state, the program jumps to step s21 with the emitted light amount data being left unchanged. If the transition to the ON state of the switch GS is detected, the set emitted light amount data is changed at step s18 from FULL to ½, from ½ to ¼, from ¼ to ⅛ or from ⅛ to FULL. The changed emitted light amount data is displayed at step s19 and data commensurate with the set emitted light amount is transmitted through the output ports PO20 and PO21 to the emitted light limiting circuit MF at step s20 and the operation proceeds to step s21.

At step s21 it is determined whether the flag DF is "1" or "0". When the flag DF is "0", this means that the camera data have not been read or that a given time has passed since the last reading (i.e. that the timer TI0 has completed the counting), and the operation goes back to step s5. When the flag DF is "1", this means that it is within the given time since the flash device FL read data from the camera body CB, so the operation proceeds to step s22 wherein it is determined whether or not the exposure control mode of the camera is M mode. If it is not the M mode, this means that the camera is set in the automatic exposure control mode of P, A or S mode, the light control mode of the flash device FL is automatically set to TTL mode at step s25 and the operation proceeds to step s26. If the camera is set in the M mode, it is then determined at step s22 whether the mode selection switch AMS has been turned on. If the transition to the ON state of the switch AMS is detected, the flash light control mode is altered at step s25, from the manual to the TTL mode and the operation proceeds to step s26. If the switch AMS remains steadily in the OFF or ON state, the operation proceeds to step s26 with the flash control mode left unchanged.

At step s24 or s25, the potential at the output port PO22 is made "Low" in the case of TTL mode so that the AND gate AN11 is enabled to output the light interruption signal that is supplied from the flash photography light measuring circuit FME in the camera body. In the case of the manual mode, the potential at the output port PO22 is made "High" to block the AND gate AN11 which then can not output the light interruption signal.

At step s26, the set flash control mode is displayed. Then, the available distance range or the effective distance is displayed at step s27 in accordance with the data fed from the camera. The subroutine to the executed at step s27 is shown in detail in FIG. 5. When the operation at step s27 is completed, the operation goes back to step s5 and the aforementioned operations are repeated.

Figure 4B:
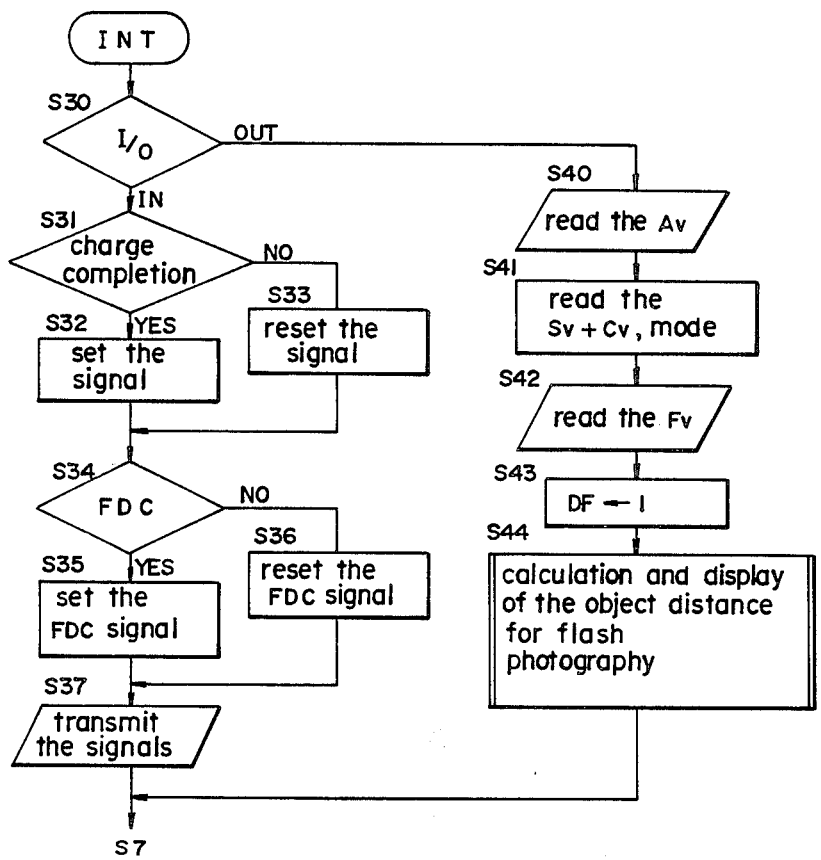

When the potential at the output port PO6 becomes "Low" to effect the data exchange between the camera CB and the flash device FL, the potential at the interruption terminal ITF of the microcomputer MCF in the flash device FL drops to "Low" and the microcomputer MCF performs the interruption routine beginning at step s30 in FIG. 4b. It is determined at step s30 whether "High" signal is being input to the input port PI11. If "High" signal is being input to the input port PI11, this means that data are to be transmitted from the flash device FL to the camera body CB and the operation proceeds to step s31, wherein it is determined whether "High" signal is being input to the input port PI14. If "High" signal is being input to the input port PI14, the charge completion signal is set at step s32. If "Low" signal is being input to the input port PI14, the charge completion signal is reset. In either case, the operation then proceeds to step s34. At step s34, it is determined whether "Low" signal is being input to the input port PI15. If "Low" signal is being input to the input port PI15, the FDC signal is set at step s35. If "High" signal is being input to the input port PI15, the FDC signal is reset at step s36. Then, the operation proceeds to step s37. At step s37, data are sequentially transmitted to the camera body CB on the basis of clock pulses fed from the camera CB, and the program goes back to step s7 in FIG. 4a.

When "Low" signal is being input to the input port PI11 at step s30, data in the camera body CB are to be read into the flash device FL and the program jumps to step s40. The microcomputer MCF first reads the diaphragm aperture data Av at step s40 which is serially input on the basis of the clock pulses from the camera body CB. Then, the microcomputer MCF reads at step s41 the data Sv+Cv a particular the film speed and exposure compensation values, and the exposure control mode data. It then reads at step s42 the data FV of the focal length of the exchangeable lens LE. Then, the flag DF is made "1" at step s43 to show that the data reading has been made, and the calculation and display of the available distance range or the effective distance are made at step s44 as in the case of the above mentioned step s27. After that, the operation goes back to step s7.

Figure 5:
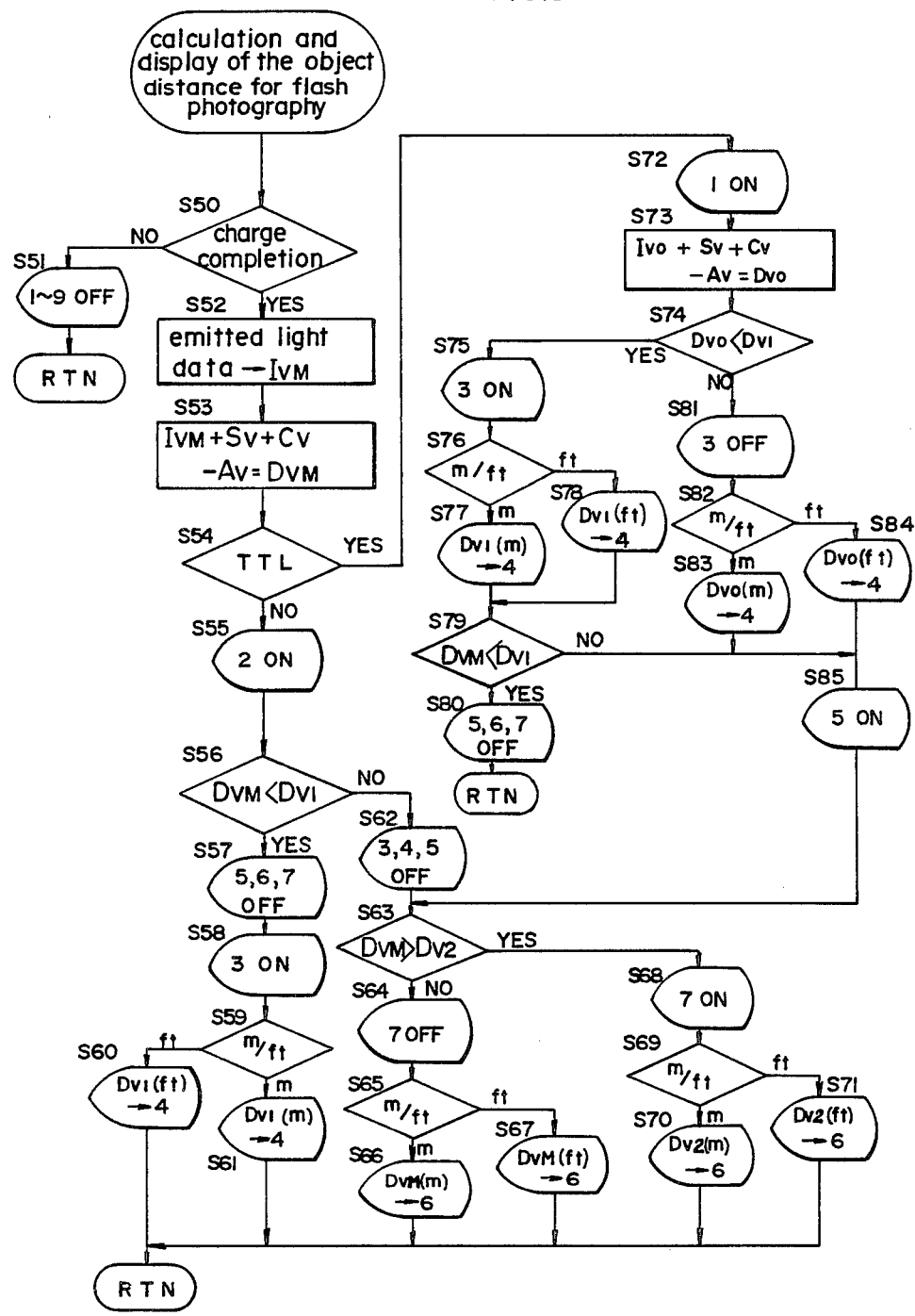

FIG. 5 is a flow chart showing a particular example of the subroutine for the steps s27 and s44. At step s50, it is determined whether or not the charging of the main capacitor has been completed. If the charging has not been completed, all the display segments shown in FIG. 2 are deenergized at step s51 and program operation returns to the main routine. If the charging has been completed, the operation proceeds to step s52.

At step s52, the set emitted light amount data is converted to a data Ivm which is suitable for the calculation of object distance as will be described below. At step s53, a calculation of $Ivm+(Sv+Cv)-Av$ with the converted data Ivm, the data Sv+CV and Av fed from the camera is made to obtain datum Dvm. Dvm represents an effective object distance inevitably determined by the set emitted light amount, the film speed, the exposure compensation amount and the diaphragm aperture value. At step s54, it is determined which of the TTL and manual flash light control modes was selected at step s24 or s25.

When the manual mode was selected, the segment 2 is first displayed at step s55 and the above calculated data Dvm is compared with the lower limit data Dv1 corresponding to the lower limit object distance value, e.g. 0.7 meter which is an object distance such that partial shading of the object at the distance will not occur due to the parallax between the optical axes of the exchangeable lens LE and the light projected from the flash device FL. If the calculated data Dvm is lower or smaller than the limit value Dv1, the program continues at step s57 wherein the segments 5, 6 and 7 are deenergized at step s57 and the segment 3 is energized at step s58. At the same time, either segment 8 or 9 is displayed in accordance with the connection of the switch MFS with the metric value display terminal c or the feet display terminal d, and the lower limit data Dv1 is digitally displayed in two-figure numerals by the segment 4 with data Dv1 being converted into an object distance expressed in meters or feet (steps s59 through s61). Then, the operation returns.

When the calculated data Dvm is equal to or above the lower limit data Dv1 at step s56, program operation jumps to the step s62 wherein the segments 3, 4 and 5 are deenergized at step s62 and it is determined at step s63 whether the calculated data Dvm is larger or smaller than a upper limit data Dv2 corresponding to the upper limit object distance value, e.g. 28 meter. If the calculated data Dvm is equal to or smaller than the upper limit data Dv2, the segment 7 is deenergized at step s64 and the segment 8 or 9 is displayed in accordance with the connection of the switch MFS with the metric display terminal c or the feet display terminal d, with the calculated data Dvm being converted into an object distance expressed in meters or feet and digitally displayed in two-figure numerals by the segment 6 (steps s65 through s67). Then, the operation returns. If the calculated data Dvm is above or greater than the upper limit value Dv2, the segment 7 is displayed at step s68 and at the same time the segment 8 or 9 is displayed in accordance with the connection of the switch MFS with the metric value display terminal c or foot value display terminal d. The upper limit data Dv2 is converted into an object distance expressed by the metric or foot unit and the converted value is displayed digitally in two-figure numerals by the segment 6 and the operation returns (steps s69 through s71).

When selection of the TTL mode was detected at step s54, the segment 1 is first displayed at step s72 and the calculation of $Iv0+(Sv+Cv)-Av$ is made at step s73 with the data $(Sv+Cv)$ and Av fed from the camera and the data Iv0 representing the minimum amount of emitted light that can be controlled. The calculation gives a datum DvO of such an object distance that is inevitably determined by the minimum amount of emitted light, the film speed, the exposure compensation amount and the diaphragm aperture value. The minimum emitted light amount is the minimum amount of flash light that can be controlled with desired accuracy by the flash light interruption signal in the TTL mode. The minimum amount is determined by the characteristics and property of the circuit of the flash device FL. Then, the calculated data Dv0 is compared with the lower limit data Dv1.

If the calculated data Dv0 is smaller than the lower limit data Dv1, the program shifts to step s75 wherein the segment 3 is displayed at step s75, the segment 8 or 9 is displayed in accordance with the connection of the switch MFS with the metric display terminal c or the foot unit display terminal d, and the lower limit data Dv1 is converted into an object distance value expressed by the metric or foot unit and displayed digitally in two figure numeral by the segment 4 (steps s76 through s78). Then, the data Dvm calculated at step s53 is compared with the lower limit data Dv1 at step s79. When the calculated data Dvm is smaller than the lower limit data Dv1, the operation returns after the segments 5, 6 and 7 are deenergized at step s80. When the calculated data Dvm is equal to or greater than the lower limit data Dv1, the operation jumps to step s85.

When the calculated data Dv0 is equal to or greater than the lower limit data Dv1 at step s74, the operation begins at step s81 wherein the segment 3 is deenergized at step s81, the segment 8 or 9 is displayed in accordance with the connection of the switch MFS with the metric display terminal c or the foot unit display terminal d, and the calculated data Dv0 is converted into an object distance expressed in meters or feet and is digitally displayed in two figure numeral by the segment 4 (steps s82 through s84). Then, the segment 5 is displayed and the above mentioned operation beginning at the step s63 is executed.

In the above described subroutine, when the calculated data Dvm or Dv0 is smaller than the lower limit data Dv1, the segments 3 and 4 are displayed to indicate that the calculated distance is smaller than the lower limit. When the calculated data Dvm or Dvo is greater than the upper limit data, the segments 6 and 7 are displayed to indicate that the calculated distance is larger than the upper limit value. When the calculated data Dvm is between the lower limit data Dv1 and the upper limit data Dv2 in the manual mode, the effective object distance for the manual mode is displayed by the segment 6. When both calculated data Dv0 and Dvm are between the lower limit data Dv1 and the upper limit data Dv2 in the TTL mode, the available object distance for the TTL mode is displayed by the segment 4, 5 and 6.

As many widely different embodiments of this invention may be made without departing from the spirit and scope thereof, it is to be understood that the invention is not limited to the specific embodiments thereof except as defined in the appended claims.

What is claimed is:

1. A flash photography system comprising a camera and an electronic flash device detachably coupled to said camera; said camera comprising:

means for generating a first data indicative of a set film speed, a second data indicative of a set amount of exposure to be compensated from a predetermined amount of exposure, and a third data indicative of a value of diaphragm aperture to be controlled;

a data transmission means for transmitting the first through third data to said flash device; and means for generating a firing signal for flash firing and transmitting the signal to said flash device;

said flash device comprising:

a light emitter for emitting a light for flash photography;

means for receiving the firing signal and effecting the control for the flash light emission in response to the received firing signal;

a data receiving means for receiving the first through third data fed from said camera;

a data output means for generating a fourth data indicative of the flash light amount to be emitted from said light emitter;

a calculation means responsive to the first through fourth data for calculating a camera-to-object distance for flash photography; and a display means for displaying the calculated distance.

2. A flash photography system as in claim 1, wherein said data transmission means of said camera further comprising a manually operable member for producing a signal in response to the manual operation thereof, and means for initiating the data transmission in response to the signal; and said flash device further comprising a timer means, responsive to the data transmission from said camera to said data receiving means, for producing a timer signal of a given duration, a detecting means for detecting the presence of the timer signal, and a display inhibit means for inhibitting the energization of said display means when the timer signal is absent.

3. An electronic flash device detachably attached to camera which electrically transmits photographing data set in the camera to said electronic flash device, said electronic flash device comprising:

a first data receiving means for receiving a first data indicative of a set film speed and transmitted from said camera;

a second data receiving means for receiving a second data indicative of the manually set amount of exposure to be compensated from a predetermined amount of exposure, the data being transmitted from said camera;

a third data receiving means for receiving a third data indicative of the value of diaphragm aperture to be controlled in said camera, the data being transmitted from said camera;

a light emitter for emitting a light to illuminate an object to be photographed;

a data output means for producing a fourth data indicative of the limit of the light amount to be emitted from said light emitter;

a control means for controlling the amount of flash light to be emitted from said light emitter;

a calculation means responsive to the first through fourth data for calculating a camera-to-object distance for flash photography; and a display means for displaying the calculated camera-to-object distance.

4. An electronic flash device as in claim 3, further comprising a capacitor for storing the energy for said light emitter, means for charging said capacitor, a detecting means for detecting the completion of the charging of said capacitor, and display inhibit means responsive to said detecting means for inhibiting the energization of said display means when the charging of said capacitor has not been completed.

5. An electronic flash device as in claim 3, further comprising a timer means responsive to the initiation of power supply to said display means for producing a timer signal of a given duration, a detecting means for detecting the presence of the timer signal, and a display inhibit means for inhibiting the energization of said display means when the timer signal is absent.

6. An electronic flash device as in claim 3, further comprising a timer means, responsive to a transmission of data from said camera to said first through third data receiving means, for producing a timer signal of a given duration, a detecting means for detecting the presence of the timer signal, a display inhibit means for inhibitting the energization of said display means when the timer signal is absent.

7. An electronic flash device as in claim 3, wherein said display means includes a liquid crystal display panel.

8. An electronic flash device as in claim 3, wherein said data output means includes a manually operable member for producing a signal in response to the manual operation thereof and a changing means, responsive to the signal from said operable member, for changing the maximum amount of flash light to be emitted from said light emitter; the camera-to-object distance calculated by said calculation means being such a distance that an object at the distance is illuminated with sufficient amount of flash light to effect a desired film exposure corresponding to the amount of exposure compensation.

9. An electronic flash device as in claim 3, wherein said control means includes an automatic flash light control means for automatically controlling the amount of flash light in accordance with the light reflected from the object to be photographed; said data output means includes a manually operable member for producing a signal in response to the manual operation thereof, a maximum amount generating means for generating a datum indicative of a maximum amount of flash light varied by the signal from said operable member, a minimum amount generating means for generating a datum indicative of a minimum amount of flash light controllable by said control means and an output means for outputting the maximum light amount data and minimum light amount data, the fourth data including the maximum and minimum light amount data; and said calculation means calculates a first camera-to-object distance by the maximum light amount data and a second camera-to-object distance by the minimum light amount data, said first and second distances being such distances that an object between the both distances is illuminated with sufficient amount of flash light by said automatic flash light control means to effect a desired film exposure corresponding to the amount of exposure compensation.

* * * * *